US011675106B2

(12) United States Patent
Almani et al.

(10) Patent No.: US 11,675,106 B2
(45) Date of Patent: Jun. 13, 2023

(54) PREDICTING FORMATION BREAKDOWN PRESSURE FOR HYDROCARBON RECOVERY APPLICATIONS

(71) Applicant: Saudi Arabian Oil Company, Dhahran (SA)

(72) Inventors: Tameem Almani, Dammam (SA); Khaqan Khan, Dhahran (SA); Mohammad H. Altwaijri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/243,365

(22) Filed: Apr. 28, 2021

(65) Prior Publication Data
US 2022/0381946 A1 Dec. 1, 2022

(51) Int. Cl.
*G01V 99/00* (2009.01)
*E21B 49/00* (2006.01)
*E21B 43/26* (2006.01)

(52) U.S. Cl.
CPC .............. *G01V 99/00* (2013.01); *E21B 43/26* (2013.01); *E21B 49/006* (2013.01)

(58) Field of Classification Search
CPC .......... G01V 99/00; G01V 1/50; E21B 43/26; E21B 49/006
See application file for complete search history.

(56) References Cited

U.S. PATENT DOCUMENTS

| 10,221,649 B2 | 3/2019 | Shahri et al. |
| 10,597,982 B2 | 3/2020 | Shahri et al. |
| 2016/0291181 A1* | 10/2016 | Sinha ................. G01V 1/50 |

OTHER PUBLICATIONS

Advanced Engineering Mathematics, Greenberg, Prentice-Hall Inc. Upper Saddle River, N.J., 1998, 1348 pages.
Fatahi, "Simulation of Hydraulic Fracture Propagation Interacted with Natural Fractures," PhD Dissertation, Curtin University, Nov. 2016, 188 pages.
Foundations of Applied Mathematics, Greenberg, Prentice-Hall Inc. Englewood Cliffs, N.J., 1978, p. 423-434, 9 pages.

(Continued)

*Primary Examiner* — Catherine T. Rastovski
*Assistant Examiner* — Kaleria Knox
(74) *Attorney, Agent, or Firm* — Fish & Richardson P.C.

(57) ABSTRACT

Systems and methods include a method for determining a breakdown pressure for the wellbore. Input parameters are received for computing a breakdown pressure for a wellbore. A pore pressure is determined using a Stehfest method equation using a function of a time duration, a distance from the wellbore, an injection fluid compressibility, a Biot poroelastic parameter, and a modified Bessel function. A poroelastic stress is determined using a poroelastic stress equation based on the pore pressure determined for the wellbore, a Composite Simpson's Rule for numerical integration, an empirical parameter, a pore pressure, a Biot poroelastic parameter, tensile strength of rock, and a Poisson distribution. A breakdown pressure is determined using a tested time-based formula, poroelastic stress, a minimum and a maximum horizontal stress, using a formula tested against multiple wells and a distance from the wellbore in a radial direction.

20 Claims, 10 Drawing Sheets

(56) References Cited

OTHER PUBLICATIONS

Haimson et al., "In Situ Stress Determination at Great Depth by Means of Hydraulic Fracturing," 11th Symposium on Rock Mechanics. W. Somerton, Society of Mining Engineers of AIME, 1970, 26 pages.
Ito et al., "Physical Background to the Breakdown Pressure in Hydraulic Fracturing Tectonic Stress Measurements," Int. J. Rock Mech. Min. Sci. & Geomech. Abstr., 1991, 28(4):285-293, 9 pages.
Ito, "Effect of pore pressure gradient on fracture initiation in fluid saturated porous media: Rock," Engineering Fracture Mechanics, 2008, 75:1753-1762, 10 pages.
Medlin et al., "Laboratory Investigation of Fracture Initiation Pressure and Orientation," presented at the SPE-AIME 51st Annual Fall Technical Conference and Exhibition, New Orleans, Oct. 3-6, 1976, 16 pages.
Numerical Analysis, Burden and Faires, Brooks/Cole, Ninth ed., Boston, MA, 2011, 895 pages.
Poroelasticity, Cheng, Springer, 2016, 893 pages.
Rice et al., "Some basic stress diffusion solutions for fluid-saturated elastic porous media with compressible constituents," Reviews of Geophysics and Space Physics, May 1976, 14(2):227-241, 16 pages.
Schmitt et al., "Poroelastic effects in the determination of the maximum horizontal principal stress in hydraulic fracturing tests—A proposed breakdown equation employing a modified effective stress relation for tensile failure," Int. J. Rock Mech. Min. Sci. & Geomech. Abstr., 1989, 26(6):499-506, 8 pages.
Yang et, "On Approximating the Modified Bessel Function of the Second Kind," Journal of Inequalities and Applications, 2017, 41, 8 pages.

\* cited by examiner

PREDICTING FORMATION BREAKDOWN PRESSURE FOR HYDROCARBON RECOVERY APPLICATIONS

TECHNICAL FIELD

The present disclosure applies to geomechanics applications used in well stimulation and hydraulic fracturing in oil and gas wells.

BACKGROUND

Determining accurate formation breakdown pressure during hydraulic fracturing operations is one of the major challenges, especially for tight sandstone formations in compressional in-situ stress regimes. An accurate estimation of the breakdown pressure value is critical in determining how much horsepower will be required on site for creating adequate fracture geometry and successful placement of stimulation materials into the created fracture. Overestimation can lead to an inappropriate selection of the well completion type and expenditure loss, while underestimation can result in operational failures. This present disclosure bridges this gap, while predicting an accurate value of the breakdown pressure, taking into account all the underlying physical parameters involved. Specifically, an improved algorithm can predict formation breakdown pressure which does not only take into account in-situ stresses and formation strength but also the properties of fluids and permeability of the rock formation.

SUMMARY

The present disclosure describes techniques that can be used for predicting formation breakdown pressure for hydrocarbon recovery applications. An improved algorithm is implemented numerically, and its results were compared against values obtained from conventional methodology as well as measured breakdown pressure values using data from actual wells. The algorithm utilizes a hybrid analytical and computational approach to compute induced pore pressures during the injection of fluids into the wellbore together with the associated poroelastic stresses as functions of the underlying physical parameters involved (including fracturing fluid compressibility, viscosity, rock porosity, and permeability). The computed quantities are then incorporated into the main tensile wellbore failure equation to compute the breakdown pressure. The algorithm was tested using data from multiple wells, and the predicted breakdown pressure values match well with the measured values during the actual hydraulic fracturing operations.

In some implementations, a computer-implemented method includes the following. Input parameters are received for computing a breakdown pressure for a wellbore. A pore pressure is determined for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order. A poroelastic stress is determined for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution. A breakdown pressure is determined for the wellbore using a tested time-based formula based, at least in part, on the poroelastic stress for the wellbore, a minimum and a maximum horizontal stress for the well, and based on a formula tested against multiple wells and the distance from the wellbore in a radial direction.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Use of the techniques of the present disclosure can lead to determining a more accurate value of the breakdown pressure during hydraulic fracturing operations. Determining more accurate values can reduce or eliminate over-estimation of breakdown pressure that could lead to an inappropriate selection of the well completion type and expenditure loss. Determining more accurate values can also prevent underestimation of breakdown pressure, which could lead to operational failures. In particular, an accurate, a priori prediction of the breakdown pressure helps in determining the pressure rating of tubulars required for fracturing treatment. This in turn reduces the number of fracking job cancellations due to the breakdown pressure exceeding the tubular limit, resulting in a cost savings.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for predicting formation breakdown pressure for hydrocarbon recovery applications. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Introduction

In hydraulic fracturing operations, an accurate estimation of the breakdown pressure is extremely important to determine how much horsepower will be needed on site. Underestimating this value might lead to operation failure, and overestimating it might lead to expenditure loss. The gap can be bridged using mathematical algorithms to predict the accurate value of the breakdown pressure.

Conventional methods to estimate breakdown pressure rely only on in-situ stresses, formation pore pressure and tensile strength of the rock formation around the wellbore. These algorithm usually calculate lower and upper bound of breakdown pressures but do not include all parameters involved, such as induced pore-pressure around the wellbore during injection which, for a given fluid injection rate, is a function of rock permeability. Most of them are merely approximations that suppress the real effects of the underlying physical parameters. A computational algorithm can be used that can estimate formation breakdown pressure taking into account all physical properties involved.

Model

The breakdown pressure is the borehole pressure at which the fracture initiation occurs. In standard borehole pressure versus time curves (obtained by in situ tests, such as formation injectivity tests), it can be considered the peak pressure at which the fracture is opened. Mathematically, the breakdown pressure ($P_f$) can be defined as the pressure at which the maximum tensile stress reaches the tensile strength of the rock ($\sigma_f$) at the wellbore. This can be expressed as:

$$S_\theta^{(1)} + S_\theta^{(2)} + S_\theta^{(3)} = \sigma_f - P_p \tag{1}$$

In the equation, $S_\theta^{(1)}$ is the circumferential stress induced by the two horizontal stresses $S_h$ and $S_H$, and $S_\theta^{(2)}$ is the stress induced by the borehole pressure $P_w$, and $S_\theta^{(3)}$ is stress induced by the fluid permeation into the formation, which is known as the poroelastic stress (and this one is a function of the pore pressure $P_p$ and other underlying physical parameters).

Figure 1:
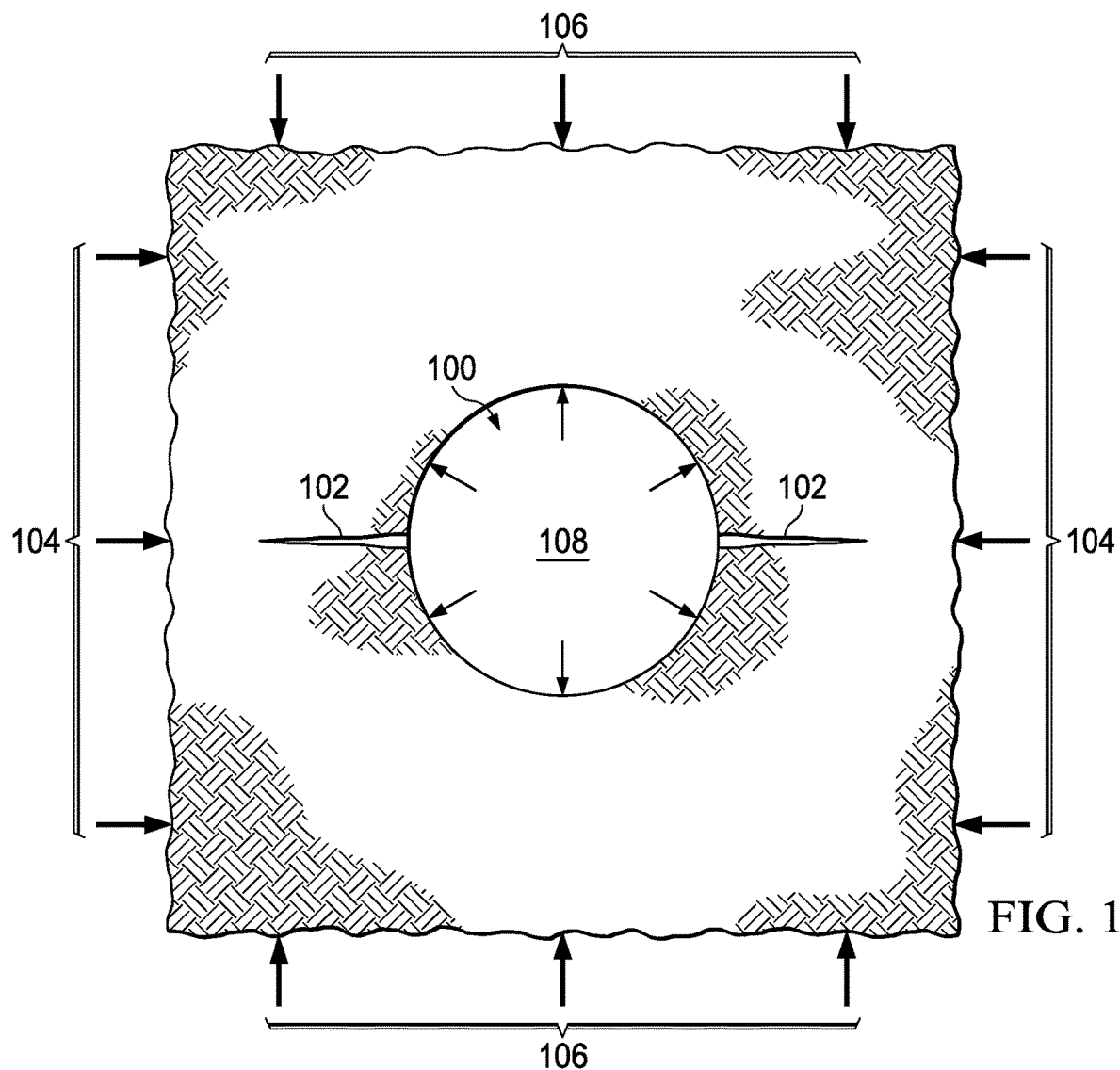
FIG. 1 is a cross-sectional view of an example of a vertical borehole in in-situ stresses and an induced fracture during hydraulic fracturing, according to some implementations of the present disclosure.

FIG. 1 is a cross-sectional view of an example of a vertical borehole 100 in in-situ stresses and an induced fracture 102 during hydraulic fracturing, according to some implementations of the present disclosure. Following a cylindrical coordinate system (r, θ), Equation (1) can be solved around the wellbore shown in FIG. 1. Note that at r=a, which is the wellbore radius, when Equation (1) is satisfied, then $P_f = P_w$. In terms of the minimum and maximum horizontal stress $S_h$ 104 and $S_H$ 106 (where $|S_H| > |S_h|$), $S_\theta^{(1)}$ and $S_\theta^{(2)}$ can be given as:

$$S_\theta^{(1)} = \frac{S_H + S_h}{2}\left(1 + \frac{a^2}{r^2}\right) - \frac{S_H - S_h}{2}\left(1 + 3\frac{a^2}{r^2}\right)\cos 2\theta \tag{2}$$

$$S_\theta^{(2)} = \frac{a^2}{r^2} P_w \tag{3}$$

The (r, θ) coordinate system can be rotated such that the r-axis is aligned with the orientation of the maximum horizontal stress $S_H$. In this case, $S_\theta^{(1)}$ takes its maximum value when θ=0, π, so Equation (1) reduces to:

$$S_\theta^{(1)} = \frac{S_H + S_h}{2}\left(1 + \frac{a^2}{r^2}\right) - \frac{S_H - S_h}{2}\left(1 + 3\frac{a^2}{r^2}\right) \tag{3a}$$

In addition, while measuring the breakdown pressure 108 at the wellbore, r=a, so the expression for $S_\theta^{(1)}$ reduces to:

$$S_\theta^{(1)} = 3S_h - S_H \tag{4}$$

In a similar way, since r=a:

$$S_\theta^{(2)} = P_w \tag{5}$$

Also assume that $\sigma_f$ is given (it can be calculated using standard techniques, but this is not a subject of research in this work). What remains is the pore pressure $P_p$ and the poroelastic stress $S_\theta^{(3)}$, and depending on how they are computed, at least two different algorithms can be used.

Pore Pressure Computation

In this algorithm, the pore pressure $P_p$ is computed by solving the homogeneous diffusion equation given (for simplicity, $P_p$ is denoted as p(t, r)):

$$\frac{\partial p}{\partial t} - c\frac{1}{r}\frac{\partial}{\partial r}\left(r\frac{\partial p}{\partial r}\right) = 0 \tag{6}$$

With the boundary condition p(t, r=a)=$P_0$, and the initial condition: p(t=0, r<a)=0. Note that $$c = \frac{K}{\mu \phi c_f},$$

K is the rock permeability, ∅ is the rock porosity, $c_f$ is the fluid compressibility, and μ is the fluid viscosity.

Equation (6) is solved by Laplace Transform as follows. First, note that Equation (6) can be written as:

$$\frac{1}{c}\frac{\partial p}{\partial t} - \frac{1}{r}\frac{\partial p}{\partial r} - \frac{\partial^2 p}{\partial r^2} = 0 \qquad (7)$$

Laplace Transform Solution

Taking the Laplace Transform of the first term in Equation (7):

$$\mathcal{L}\left(\frac{1}{c}\frac{\partial p}{\partial t}\right) = \frac{1}{c}\int_0^\infty \frac{\partial p}{\partial t}e^{-st}dt = \frac{1}{c}[p(t,r)e^{-st}]_0^\infty + \frac{s}{c}\int_0^\infty p(t,r)e^{-st}dt \qquad (7a)$$

$$= \frac{s}{c}\int_0^\infty p(t,r)e^{-st}dt = \frac{s}{c}\tilde{p} \qquad (7b)$$

Note that the boundary vanishes using the initial condition $p(t=0, r<a)=0$. Taking the Laplace Transform of the second term in Equation (7) produces:

$$\mathcal{L}\left(\frac{1}{r}\frac{\partial p}{\partial r}\right) = \int_0^\infty \frac{1}{r}\frac{\partial p}{\partial r}e^{-st}dt = \frac{1}{r}\frac{\partial}{\partial r}\left(\int_0^\infty pe^{-st}dt\right) = \frac{1}{r}\frac{\partial \tilde{p}}{\partial r} \qquad (7c)$$

Taking the Laplace Transform of the third term in Equation (7):

$$\mathcal{L}\left(\frac{\partial^2 p}{\partial r^2}\right) = \int_0^\infty \frac{\partial^2 p}{\partial r^2}e^{-st}dt = \frac{\partial^2 \tilde{p}}{\partial r^2} \qquad (7d)$$

Finally, taking the Laplace Transform of the boundary condition:

$$\mathcal{L}(p(t,a) = P_0) = \int_0^\infty P_0 e^{-st}dt = P_0 \int_0^\infty e^{-st}dt = -\frac{P_0}{s}\int_0^\infty -se^{-st}dt \qquad (7e)$$

$$= -\frac{P_0}{s}[e^{-st}]_0^\infty = -\frac{P_0}{s}[0-1] = \frac{P_0}{s} \qquad (7f)$$

Therefore, Equation (7) in the Laplace Transform domain reads:

$$\frac{\partial^2 \tilde{p}(s,r)}{\partial r^2} + \frac{1}{r}\frac{\partial \tilde{p}(s,r)}{\partial r} - \frac{s}{c}\tilde{p}(s,r) = 0 \qquad (8)$$

with the boundary condition:

$$\tilde{p}(s, r=a) = \frac{P_0}{s} \qquad (8a)$$

This can be written as:

$$\frac{s}{c}\left(\frac{c}{s}\frac{\partial^2 \tilde{p}}{\partial r^2} + \frac{c}{sr}\frac{\partial \tilde{p}}{\partial r} - \tilde{p}\right) = 0 \qquad (9)$$

Making the following change of variables, let:

$$y = \sqrt{\frac{s}{c}}r, \text{ This implies that } \frac{\partial y}{\partial r} = \sqrt{\frac{s}{c}} \qquad (9a)$$

Now:

$$\frac{\partial \tilde{p}(s,y)}{\partial r} = \frac{\partial \tilde{p}}{\partial y}\frac{\partial y}{\partial r} = \sqrt{\frac{s}{c}}\frac{\partial \tilde{p}}{\partial y} \qquad (9b)$$

In a similar way:

$$\frac{\partial^2 \tilde{p}(s,y)}{\partial r^2} = \frac{s}{c}\frac{\partial^2 \tilde{p}}{\partial y^2} \qquad (9c)$$

Moreover:

$$\frac{c}{sr}\frac{\partial \tilde{p}}{\partial r} = \frac{c}{s}\sqrt{\frac{s}{c}}\frac{1}{y}\sqrt{\frac{s}{c}}\frac{\partial \tilde{p}}{\partial y} = \frac{1}{y}\frac{\partial \tilde{p}}{\partial y} \qquad (9c)$$

Therefore, Equation (9) becomes:

$$\frac{s}{c}\left(\frac{\partial^2 \tilde{p}(s,y)}{\partial y^2} + \frac{1}{y}\frac{\partial \tilde{p}(s,y)}{\partial y} - \tilde{p}(s,y)\right) = 0 \qquad (10)$$

This reduces to:

$$\frac{\partial^2 \tilde{p}(s,y)}{\partial y^2} + \frac{1}{y}\frac{\partial \tilde{p}(s,y)}{\partial y} - \tilde{p}(s,y) = 0 \qquad (11)$$

Now, this is a "Modified Bessel Equation" of order 0, and admits the general solution:

$$\tilde{p}(s,y) A\, I_0(y) + B\, K_0(y) \qquad (12)$$

where $I_0(x)$ is the modified Bessel function of the first kind of order 0, and $K_0(x)$ is the modified Bessel function of the second kind of order 0, and A and B are constants. Asymptotically, $I_0(x)$ and $K_0(x)$ can be given as:

$$I_0(y) \sim \begin{cases} 1 & \text{as } y \to 0 \\ \frac{e^y}{\sqrt{2\pi y}} & \text{as } y \to \infty \end{cases} \qquad (12a)$$

and $$K_0(y) \sim \begin{cases} -\ln(y) & \text{as } y \to 0 \\ \frac{e^{-y}}{\sqrt{2y/\pi}} & \text{as } y \to \infty \end{cases} \qquad (12b)$$

Note that the pressure will dissipate when moving away from the well, so as $y \to \infty$, $\tilde{p}(s, \infty)=0$. Substituting in Equation (12):

$$0 = \tilde{p}(s, \infty) = A\, I_0(\infty) + B\, K_0(\infty) \qquad (12c)$$

Now, $K_0(\infty)=0$, so: $0=\tilde{p}(s, \infty)=A\, I_0(\infty)$. This implies that $A=0$, so Equation (12) reduces to:

$$\tilde{p}(s, y) = B\, K_0(y) \qquad (13)$$

Now, applying the boundary condition to determine the value of the constant B:

$$\tilde{p}(s, r=a) = BK_0\left(\sqrt{\frac{s}{c}}a\right) = \frac{P_0}{s} \quad (13a)$$

Thus:

$$B = \frac{P_0}{sK_0\left(\sqrt{\frac{s}{c}}a\right)} \quad (13b)$$

Therefore, the final solution is given as:

$$\tilde{p}(s, y) = \frac{P_0 K_0(y)}{sK_0\left(y\sqrt{\frac{s}{c}}a\right)} \quad (13c)$$

Recalling that $$y = \sqrt{\frac{s}{c}}r,$$

the final solution in terms of s, and r is given by:

$$\tilde{p}(s, r) = \frac{P_0 K_0\left(\sqrt{\frac{s}{c}}r\right)}{sK_0\left(\sqrt{\frac{s}{c}}a\right)} \quad (14)$$

Now Equation (14) represents the pore pressure solution in the Laplace Transform domain. Note that the exact expression of is given by:

$$K_0(x) = -\left(\ln\left(\frac{x}{2}\right)+\gamma\right)\sum_{k=1}^{\infty}\left(\frac{1}{(k!)^2}\left(\frac{x}{2}\right)^{2k}\right)+\sum_{k=1}^{\infty}\left(\left(\sum_{j=1}^{k}\frac{1}{j}\right)\frac{1}{(k!)^2}\left(\frac{x}{2}\right)^{2k}\right) \quad (14a)$$

where $\gamma=0.5772151$, known as the Euler's Constant. Note that the infinite summations in the expression of $K_0(x)$ are dominated by the growth of the term $(k!)^2$ setting in the denominator. Therefore, numerically, the summations can be stopped at a relatively large finite value of k. An alternative way to compute $K_0(x)$ is to make use of the inequality:

$$\frac{\sqrt{\pi}e^{-x}}{\sqrt{2x+\frac{1}{2}}} < K_0(x) < \frac{\sqrt{\pi}e^{-x}}{\sqrt{2x}} \quad (14b)$$

Therefore, the following approximation of $K_0(x)$ can be derived by taking the average of the lower and upper bounds:

$$K_0(x) \cong \frac{\sqrt{\pi}e^{-x}}{2}\left(\frac{1}{\sqrt{2x+\frac{1}{2}}} + \frac{1}{\sqrt{2x}}\right) \quad (14c)$$

Inverting the Laplace Transform Solution

Since the modified Bessel function $K_0$ is a summation of an infinite series, inverting the Laplace transform analytically might not lead to accurate results. Therefore, Equation (14) is numerically inverted using the well-known Laplace Transform Inversion, the Stehfest Method. Following this method, the pressure solution is given by:

$$p(t, r) = \frac{\ln(2)}{t}\sum_{i=1}^{n}c_i\tilde{p}\left(\frac{i\ln(2)}{t}, r\right) \quad (14d)$$

And in expanded form:

$$(t, r) = \frac{\ln(2)}{t}\sum_{i=1}^{n}c_i\left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right) \text{ where:} \quad (15)$$

$$c_i = (-1)^{i+\frac{n}{2}}\sum_{k=\lceil\frac{i+1}{2}\rceil}^{\min(i,\frac{n}{2})}\left(\frac{k^{\frac{n}{2}}(2k)!}{\left(\frac{n}{2}-k\right)!k!(k-1)!(i-k)!(2k-i)!}\right) \quad (16)$$

and where n is the number of terms included in the series approximation (15) which must be a positive even number. In the algorithm, n=8.

Prior Art Methods for Computing Breakdown Pressure $P_f$

In the first algorithm, the pore pressure solution given by Equation (15) is incorporated into approximations for computing the breakdown pressure. At least two different breakdown pressure equations can be used for impermeable and permeable rocks respectively. If the formation is impermeable, the breakdown pressure can be given by:

$$P_f = \sigma_f - (3S_h - S_H) - \beta P_p \quad (17)$$

If the formation is permeable, the breakdown pressure is given by:

$$P_f = \frac{\sigma_f - (3S_h - S_H) - \alpha\left(\frac{1-2v}{1-v}\right)P_p}{1+\beta - \alpha\left(\frac{1-2v}{1-v}\right)} \quad (18)$$

where $\alpha$ is the Biot poroelastic parameter, $$\alpha = 1 - \frac{K_B}{K_M},$$

$K_B$ is the bulk modulus that includes contributions of mineral grains, microcracks, and pores, and $K_M$ is the intrinsic bulk modulus of the rock only, $v$ is the Poisson ratio, and $\beta$ is a parameter to be calibrated:

$$0 \leq \beta \leq 1 \quad (18a)$$

The value of $\beta$ can be determined experimentally by:

$$\beta = \frac{P_c + \sigma_f}{P_p} - \left(1 - \alpha\left(\frac{1-2v}{1-v}\right)\right) \quad (19)$$

where $P_c$ is the hydrostatic confining pressure. However, this equation does not take into account the effect of tectonic stresses therefore it cannot be used in practice. As a workaround solution, the value of the $\beta$ is calibrated based on the permeability of the formation and the actual measured breakdown pressure (this will be described in details in the next section). For impermeable formation, the breakdown pressure is computed as:

$$P_f = \sigma_f - (3S_h - S_H) - \beta\left(\frac{\ln(2)}{t}\sum_{i=1}^{n} c_i \left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right) \quad (20)$$

For a permeable formation:

$$P_f = \frac{\sigma_f - (3S_h - S_H) - \alpha\left(\frac{1-2v}{1-v}\right)\left(\frac{\ln(2)}{t}\sum_{i=1}^{n} c_i \left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right)}{1 + \beta - \alpha\left(\frac{1-2v}{1-v}\right)} \quad (21)$$

where $c_i$ is given by Equation (16), $$c = \frac{K}{\mu \phi c_f},$$

and n=8.

Parameters Calibration

There are several parameters to be calibrated in Equations (20), and (21). In order to do that, the pore pressure response, given in Equation (15), was studied as the permeability changes. The time was fixed to 1000 seconds, which is the typical time at which the formation will break after slurry injection, and the permeability values were varied.

Figure 2:
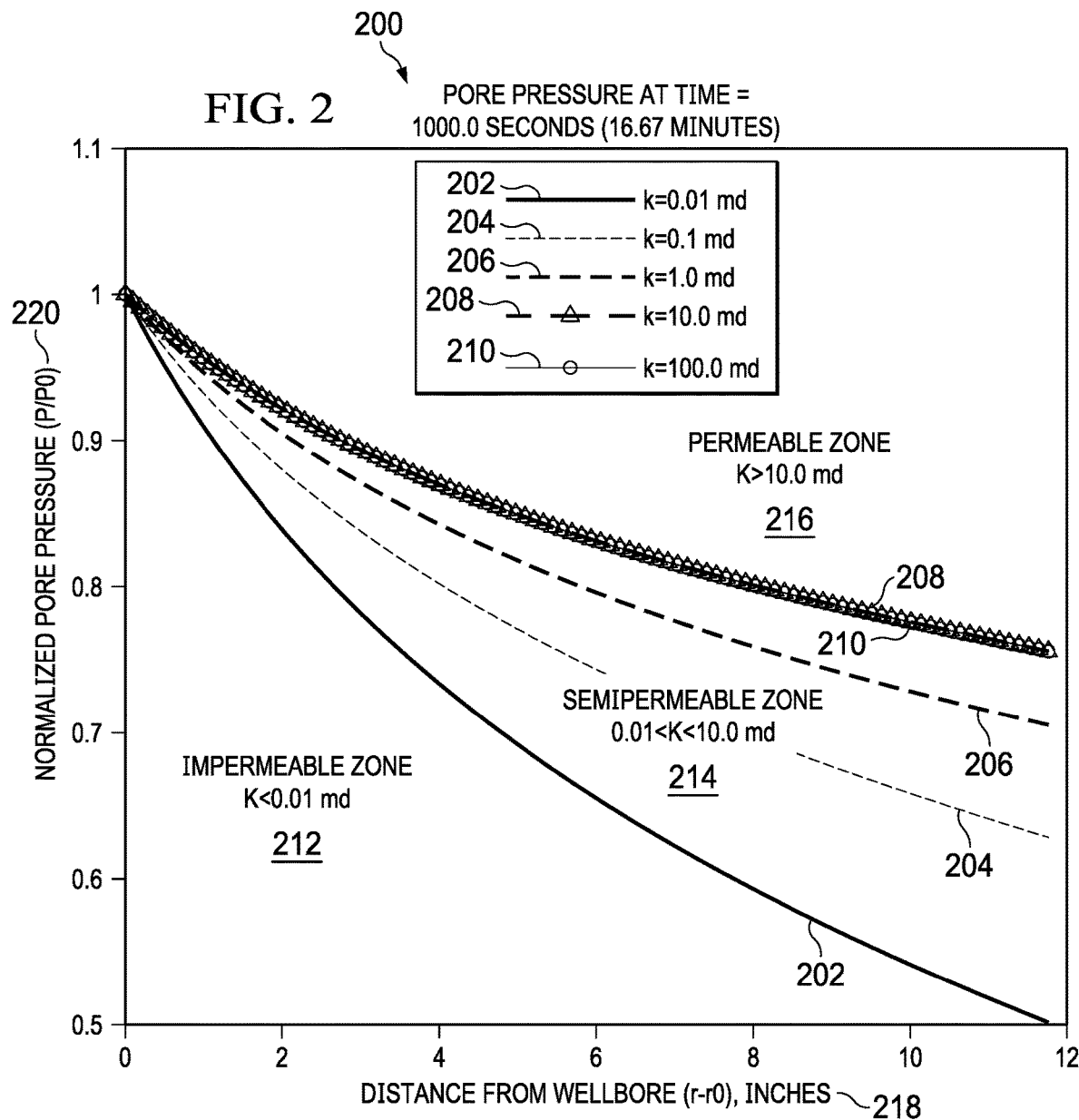
FIG. 2 is a graph showing examples of pore pressure response curves, according to some implementations of the present disclosure.

FIG. 2 is a graph showing examples of pore pressure response curves 200, according to some implementations of the present disclosure. The pore pressure response curves 200 are given by Equation (15), when moving away from the wellbore (here, $r_0$=a). The different curves corresponds to different permeability values. FIG. 2 shows that the pore-pressure versus distance from the wellbore graph can be divided into three zones: an impermeable zone 212, where K<0.01 md; a semipermeable zone 214, where 0.01<K<10.0 md; and a permeable zone 216, where K>10.0 md. Values r and $\beta$ used in equations can be calibrated depending based on each zone. This leads to the first example algorithm, given in the next section. The pore pressure response curves includes curves 202, 204, 206, 208, and 210 for K values 0.01, 0.1, 1.0, 10.0, and 100.0, respectively. The curves are plotted relative to a distance 218 from the wellbore (for example, in inches) and a normalized pore pressure 220.

Breakdown Pressure Algorithm (1)—Based on Conventional Approximations

Figure 3:
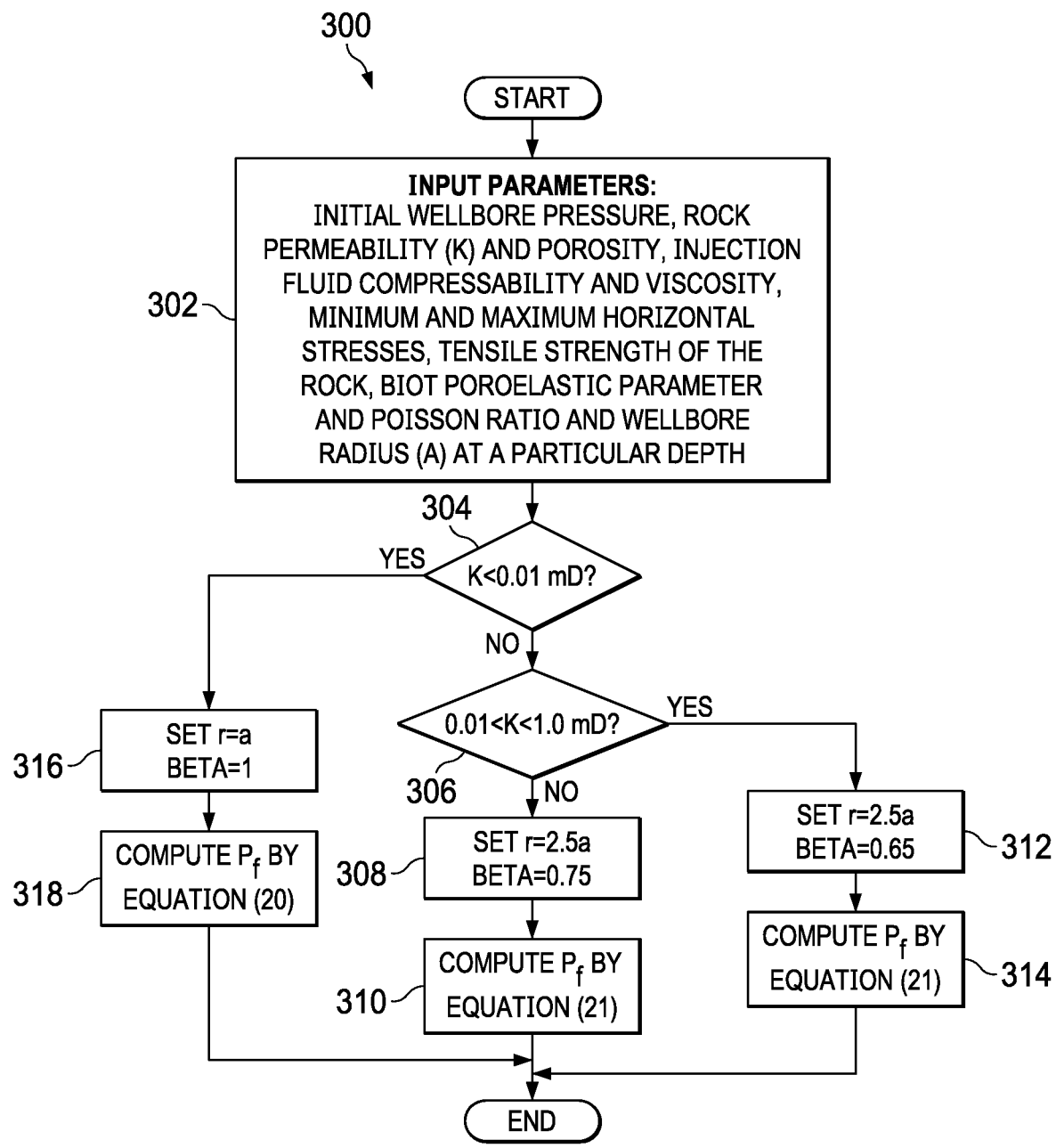
FIG. 3 is a flow diagram of an example of a workflow used for conventional breakdown pressure algorithm, according to some implementations of the present disclosure.

The main steps of Algorithm (1) are shown in FIG. 3. The pseudocode of the algorithm is as follows in Table (1):

TABLE (1)

Algorithm (1)

| | |
|---|---|
| Input: | Initial wellbore pressure $P_0$, rock permeability K, rock porosity $\phi$, injection fluid compressibility $c_f$, injection fluid viscosity $\mu$, minimum and maximum horizontal stresses $S_h$ and $S_H$, tensile strength of the rock $\sigma_f$, Biot poroelastic parameter $\alpha$, Poisson ratio $v$, and wellbore radius a at a particular depth |
| Output: | Breakdown pressure $P_f$ |
| Step 1 | Set time t = 1000 seconds |
| Step 2 | If (K < 0.01 md) Then |
| Step 3 | Set r = a |
| Step 4 | Set $\beta$ = 1 |
| Step 5 | Compute: |

$$P_f = \sigma_f - (3S_h - S_H) - \beta\left(\frac{\ln(2)}{t}\sum_{i=1}^{n} c_i \left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right) \quad (21a)$$

With $c_i$ is given by Equation (16), $c = \frac{K}{\mu \phi c_f}$, and n = 8.

TABLE (1)-continued

Algorithm (1)

Step 6   Else if (0.01 < K < 1.0 md)
Step 7   Set radius r = 2.5a (2.5 times the wellbore radius a)
Step 8   Set β = 0.65
Step 9   Compute:

$$P_f = \frac{\sigma_f - (3S_h - S_H) - \alpha\left(\frac{1-2v}{1-v}\right)\left(\frac{\ln(2)}{t}\sum_{i=1}^{n} c_i \left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right)}{1 + \beta - \alpha\left(\frac{1-2v}{1-v}\right)} \quad (21b)$$

Step 10  Else (K > 1.0 md)
Step 11  Set r = 2.5a
Step 12  Set B = 0.75
Step 13  Compute:

$$P_f = \frac{\sigma_f - (3S_h - S_H) - \alpha\left(\frac{1-2v}{1-v}\right)\left(\frac{\ln(2)}{t}\sum_{i=1}^{n} c_i \left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right)}{1 + \beta - \alpha\left(\frac{1-2v}{1-v}\right)} \quad (21c)$$

FIG. 3 is a flow diagram of an example of a workflow 300 used for conventional breakdown pressure algorithm, according to some implementations of the present disclosure. The algorithm represented by the workflow 300, called Breakdown Pressure Algorithm (1), can be an average or a combination of convention algorithms, for example, and is also based on information in Table (1).

At 302, input parameters are received or set. At 304, if rock permeability K is not less than 0.01 mD, then step 306 is performed. At 306, if K is not between 0.01 and 1.0 mD, then step 308 is performed. At 308, r is set to 2.5a, and Beta is set at 0.75. At 310, $P_f$ is computed by Equation (21). If, at 306, K is between 0.01 and 1.0 mD, then step 312 is performed. At 312, r is set to 2.5a, and Beta is set at 0.65. At 314, Pf is computed by Equation (21). If, at 304, if K is less than 0.01 mD, then step 316 is performed. At 316, r is set to a, and Beta is set at 1.0. At 318, $P_f$ is computed by Equation (20).

Results

Figure 4:
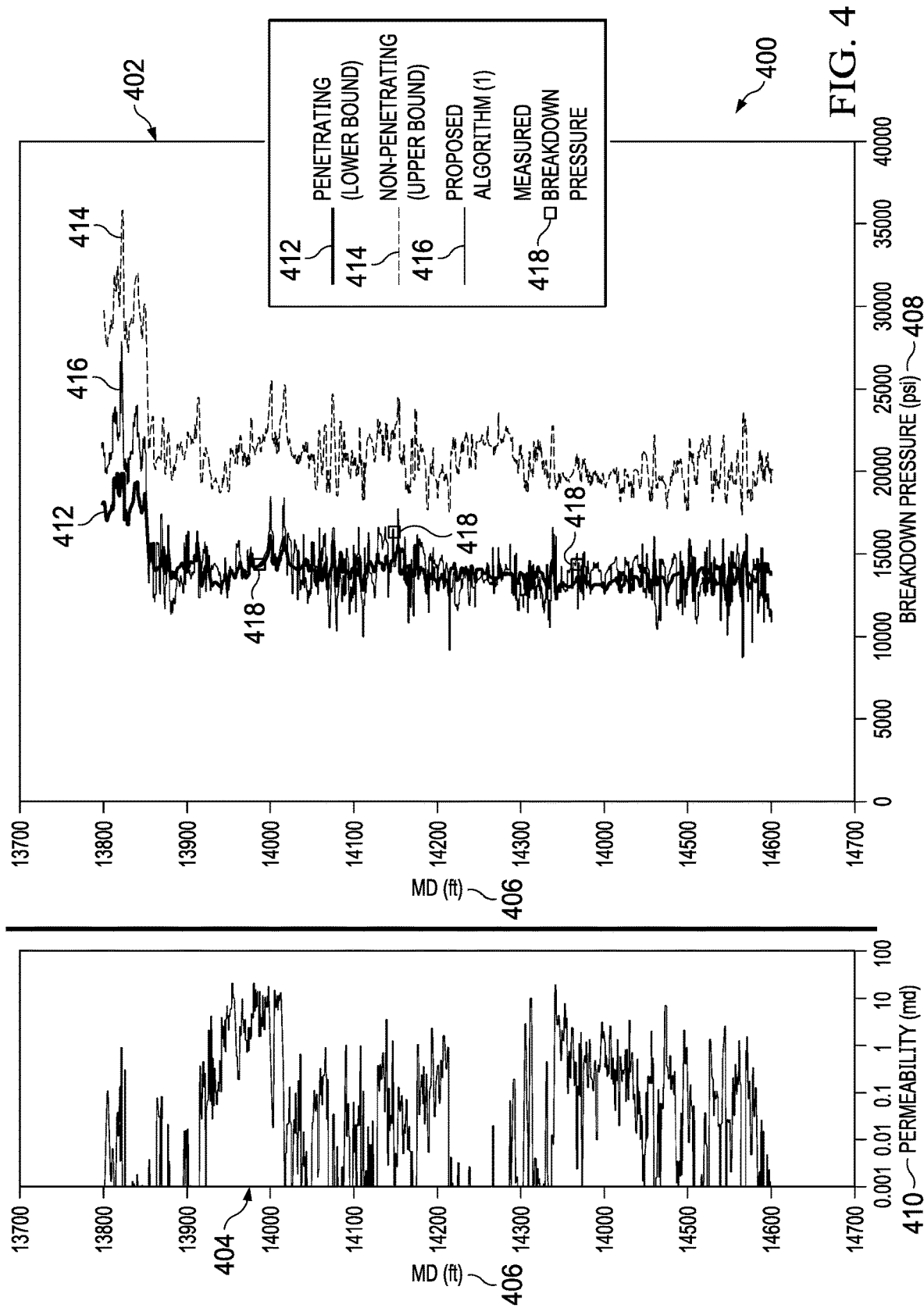
FIG. 4 is a diagram showing examples of a breakdown pressure graph and a permeability plot, according to some implementations of the present disclosure.

FIG. 4 is a diagram 400 showing examples of a breakdown pressure graph 402 and a permeability plot 404, according to some implementations of the present disclosure. The breakdown pressure graph 402 and the permeability plot 404 are plotted relative to a common depth 406 (for example, in feet). FIG. 4 shows the results of the first algorithm, implemented in MATLAB and tested against the data for one well. The results of the first algorithm are compared to the lower and upper bounds for computing the breakdown pressure 408 (for example, in pounds per square inch (psi)) in the breakdown pressure graph 402. The upper bound for the breakdown pressure 408 is obtained when ignoring the effects of the pore pressure, and poroelastic stresses, and is given by:

$$P_{f-Upper\ Bound} = \sigma_f - (3S_h - S_H) \quad (22)$$

In contrast, the lower bound for the breakdown pressure relies on crude approximations for both the pore pressure and the poroelastic stresses, and is given by:

$$P_{f-Lower\ Bound} = \frac{\sigma_f - (3S_h - S_H)}{\alpha\left(\frac{1-2v}{1-v}\right)} \quad (23)$$

In FIG. 4, the permeability plot 404 shows the formation permeability values 410 (in log scale, in millidarcies (md)). The breakdown pressure graph 402 shows the corresponding breakdown pressure values computed in three different ways. A curve 412 shows the lower bound formula (Equation (23)). A curve 414 uses the upper bound formula (Equation (22)). A curve 416 plots the pressure resulting from the Breakdown Pressure Algorithm (1). Squares 418 show measured (actual) breakdown pressure values measured during the process of hydraulic fracturing. These results show that, with the proper calibration of the parameters involved, the first algorithm is able to capture the correct breakdown pressure values.

Breakdown Pressure Algorithm (1) Drawbacks

Despite the fact that the first algorithm performed well in the case shown in FIG. 4, the algorithm suffers from the following drawbacks.

The first drawback is that the main problem of this approach is that the data for proper parameter calibration is not always available. In fact, the main purpose of this whole work is to predict correct breakdown pressure values prior to performing the hydraulic fracturing job. This means that the parameters cannot be calibrated before stimulating the well and recording actual breakdown pressure values. This defeats the whole purpose of this work, as the ultimate goal is to design an algorithm that can predict correct breakdown pressure values before stimulating the well.

The second drawback is that the algorithm relies heavily on the accurate value of the parameter $\beta$. Now, estimating the value of $\beta$ experimentally by Equation (19):

$$\beta = \frac{P_c + \sigma_f}{P_p} - \left(1 - \alpha\left(\frac{1-2\nu}{1-\nu}\right)\right) \tag{23a}$$

is not feasible in practice, as this expression ignores the effects of tectonic stresses, and is only valid for experimental purposes. In addition, it does not capture all effects of all the underlying physical processes involved.

The third drawback is that introducing the $\beta$ parameter to Equations (17), and (18) is not derived mathematically. In fact, the $\beta$ parameter was introduced to solve the issue of having a number of laboratory hydraulic fracturing experiments for which there is no breakdown pressure equation that can match the observed breakdown pressure values.

The fourth drawback is that the accuracy of the obtained results is highly sensitive to the choices of $\beta$ for each zone. Since $\beta$ is a parameter between 0 and 1 ($0 \leq \beta \leq 1$), and is unknown a priori, a natural choice for $\beta$ is 0.5. Trying this choice for the case as previously described yields the results shown in FIG. 5. Clearly, when the value of $\beta$ is altered, the algorithm loses its accuracy and validity.

Figure 5:
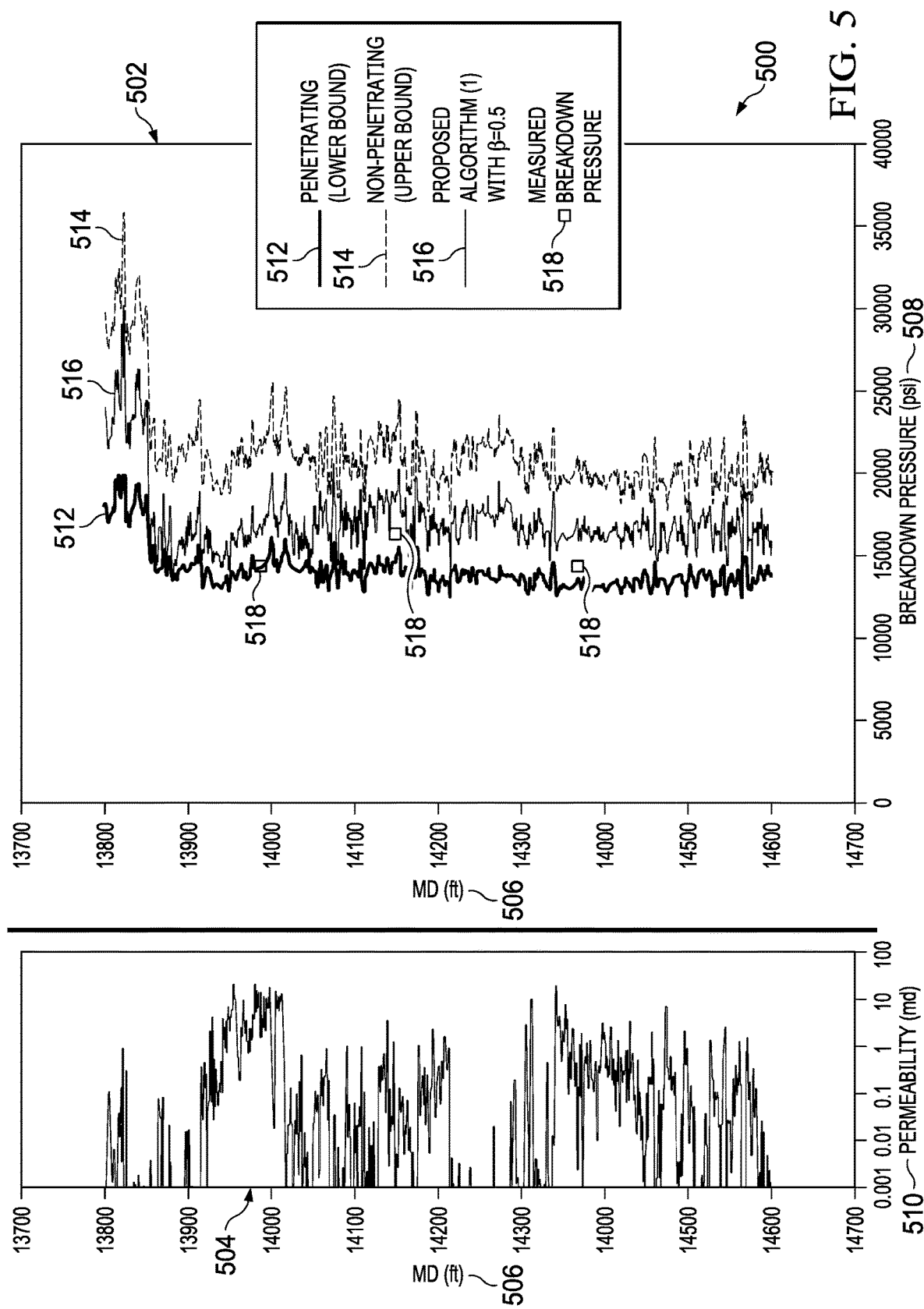
FIG. 5 is a diagram showing examples of a breakdown pressure graph and a permeability plot, according to some implementations of the present disclosure.

FIG. 5 is a diagram 500 showing examples of a breakdown pressure graph 502 and a permeability plot 504, according to some implementations of the present disclosure. The breakdown pressure graph 502 and the permeability plot 504 are plotted relative to a common depth 506 (for example, in feet). The permeability plot 504 shows formation permeability values 510 (in log scale, in millidarcies (md)). The breakdown pressure graph 502 shows the corresponding breakdown pressure values 508 computed in three different ways. Curve 512 uses the lower bound formula (Equation (23)). Curve 514 uses the upper bound formula (Equation (22)). Curve 516 is the pressure resulting from the Breakdown Pressure Algorithm (1) using ($\beta$=0.5 for all permeability zones. Squares 518 show the measured (actual) breakdown pressure values. As such, the Breakdown Pressure Algorithm (1) is not able to predict the actual breakdown pressure values.

Due to the drawbacks, is it concluded that the Breakdown Pressure Algorithm (1) is not feasible to be used for practical purposes, and it can be subjected to lots of uncertainties due to the ambiguity of the parameters involved, especially the parameter $\beta$. This leads to introducing an improved Breakdown Pressure Algorithm in the following section, which eliminates completely the $\beta$ dependence and the associated drawbacks previously described.

New Improved Breakdown Pressure Algorithm

To overcome the drawbacks associated with the first algorithm, a new improved Breakdown Pressure Prediction Algorithm is introduced in this section. In this algorithm, the dependence on any empirical parameter such as the $\beta$ parameter previously described is eliminated, enabling the theoretical derivation of an expression of the breakdown pressure based on Equation (1).

In this algorithm, the value of the poroelastic stress $S_\theta^{(3)}$ is numerically computed based on the computed pore pressure. The expression of $S_\theta^{(3)}$ can be written as:

$$S_\theta^{(3)}(t, r) = \alpha\left(\frac{1-2\nu}{1-\nu}\right)\left(\frac{1}{r^2}\int_0^r p(t, r)\rho d\rho - p(t, r)\right) \tag{24}$$

Substituting Equation (15) into Equation (24), the final expression for $S_\theta^{(3)}$ is:

$$S_\theta^{(3)}(t, r) = \alpha\left(\frac{1-2\nu}{1-\nu}\right) \left\{ \frac{1}{r^2}\int_0^r \left[ \frac{\ln(2)}{t}\sum_{i=1}^n c_i \frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)} \right]\rho d\rho - \frac{\ln(2)}{t}\sum_{i=1}^n c_i \frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)} \right\} \tag{25}$$

With $c_i$ is given by Equation (16), $$c = \frac{K}{\mu\phi c_f},$$

and n=8.

Now, to compute the breakdown pressure $P_f$, Equation (1) is used:

$$S_\theta^{(1)} + S_\theta^{(2)} + S_\theta^{(3)} = \sigma_f - P_p \tag{25a}$$

Note that at the wellbore, r=a, thus:

$$S_\theta^{(2)} = \frac{a^2}{a^2}P_w = P_w = P_f \tag{26}$$

Substituting Equations (15), (25), and (26) into Equation (1), and solving for $P_f$, the detailed expression is derived:

$$P_f = \sigma_f - (3S_h - S_H) - \left(1 - \alpha\left(\frac{1-2\nu}{1-\nu}\right)\right)\left(\frac{\ln(2)}{t}\sum_{i=1}^n c_i \frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right) - \tag{27}$$

$$\alpha\left(\frac{1-2v}{1-v}\right)\left\{\frac{1}{r^2}\int_0^r\left[\frac{\ln(2)}{t}\sum_{i=1}^n\left(c_i\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right)\right]\rho d\rho\right\}$$

With $c_i$ given by Equation (16), $$c = \frac{K}{\mu\phi c_f},$$

and n=8.

Note that the Composite Simpson's Rule is used to evaluate the integral in the last term of Equation (27). This leads to an Improved Breakdown Pressure Algorithm (2), which eliminates completely the β dependence associated with the first algorithm.

Improved Breakdown Pressure Algorithm (2)

Figure 6:
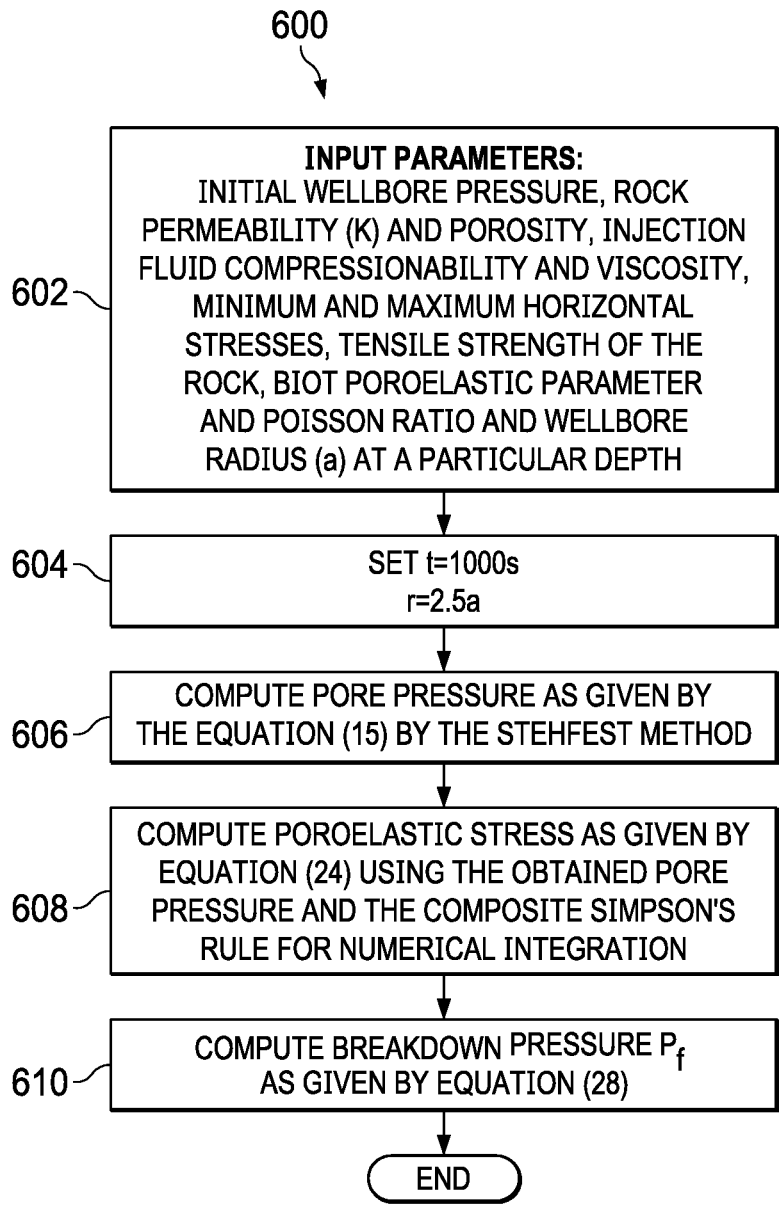
FIG. 6 is a flow diagram of a workflow for an Improved Breakdown Pressure Algorithm (2), according to some implementations of the present disclosure.

The main steps of Algorithm (2) are shown in FIG. 6. The pseudocode of the algorithm is as follows in Table (2):

TABLE (2)

| | Algorithm (2) |
|---|---|
| Input | Initial Wellbore Pressure $P_0$, Rock Permeability K, Rock Porosity ϕ, Injection Fluid Compressibility $c_f$, and Injection Fluid Viscosity μ. Minimum and Maximum Horizontal stresses $S_h$ and $S_H$, Tensile Strength of The Rock $\sigma_f$, Biot Poroelastic Parameter α, Poisson Ratio v, Wellbore Radius a, at a Particular Depth |
| Output | Breakdown Pressure $P_f$ |
| Step 1 | Set time t = 1000 seconds |
| Step 2 | Set r = 2.5 a |
| Step 3 | Compute pore pressure p(t, r) = as given in Equation (15): |

$$p(t, r) = \frac{\ln(2)}{r}\sum_{i=1}^n c_i\left(\frac{P_0 K_0\left(\sqrt{\frac{i\ln(2)}{tc}}r\right)}{\frac{i\ln(2)}{t}K_0\left(\sqrt{\frac{i\ln(2)}{tc}}a\right)}\right) \quad (27a)$$

With $c_i$ as given by Equation (16), $c = \frac{K}{\mu\phi c_f}$, and n = 8.

Step 4  Compute the Poroelastic Stress $S_\theta^{(3)}$ (t, r) as given in Equation (24)

$$S_\theta^{(3)}(t, r) = \alpha\left(\frac{1-2v}{1-v}\right)\left(\frac{1}{r^2}\int_0^r p(t, r)\rho d\rho - p(t, r)\right) \quad (27b)$$

Using the Composite Simpson's Rule for numerical integration as follows:

Step 4.1  Set $h = \frac{r}{N}$  (N is the number of sub-intervals used in the numerical Composite Simpson's Rule, for example, N = 1000)

Step 4.2  Set xb = p(t, r) × r (p(t, r) is computed at Step 3).
Step 4.3  Set EvenTerms = 0.0
Step 4.4  Set OddTerms = 0.0
Step 4.5  For(i = 1 to N − 1){
　　Set x = ih
　　If( Modulus(i, 2) = 0)
　　　EvenTerms = EvenTerms + p(t, r) × x
　　Else
　　　OddTerms = OddTerms + p(t,r) × x
}

Set Integral = $\frac{h}{3}$(xb + 2 × EvenTerms + 4 × OddTerms)

TABLE (2)-continued

Algorithm (2)

Step 4.6
$$S_\theta^{(3)}(t, r) = \alpha\left(\frac{1-2v}{1-v}\right)\left(\frac{1}{r^2} \text{Integral} - p(t, r)\right) \quad (27c)$$

Step 5 Compute the breakdown pressure as:
$$P_f = \sigma_f - (3S_h - S_H) - S_\theta^{(3)}(t, r) - p(t, r) \quad (28)$$

FIG. 6 is a flow diagram of a workflow 600 for an Improved Breakdown Pressure Algorithm (2), according to some implementations of the present disclosure. At 602, input parameters are received or input. At 604, time t is set to 1000 seconds (s), and r is set to 2.5a. At 606, the pore pressure is computed as given by Equation (15). At 608, poroelastic stress is computed using Equation (24) using the obtained pore pressure and Composite Simpson's Rule for numerical integration. At 610, breakdown pressure $P_f$ is computed using Equation (28). The workflow 600 is also based on information available in Table (2).

Results

Figure 7:
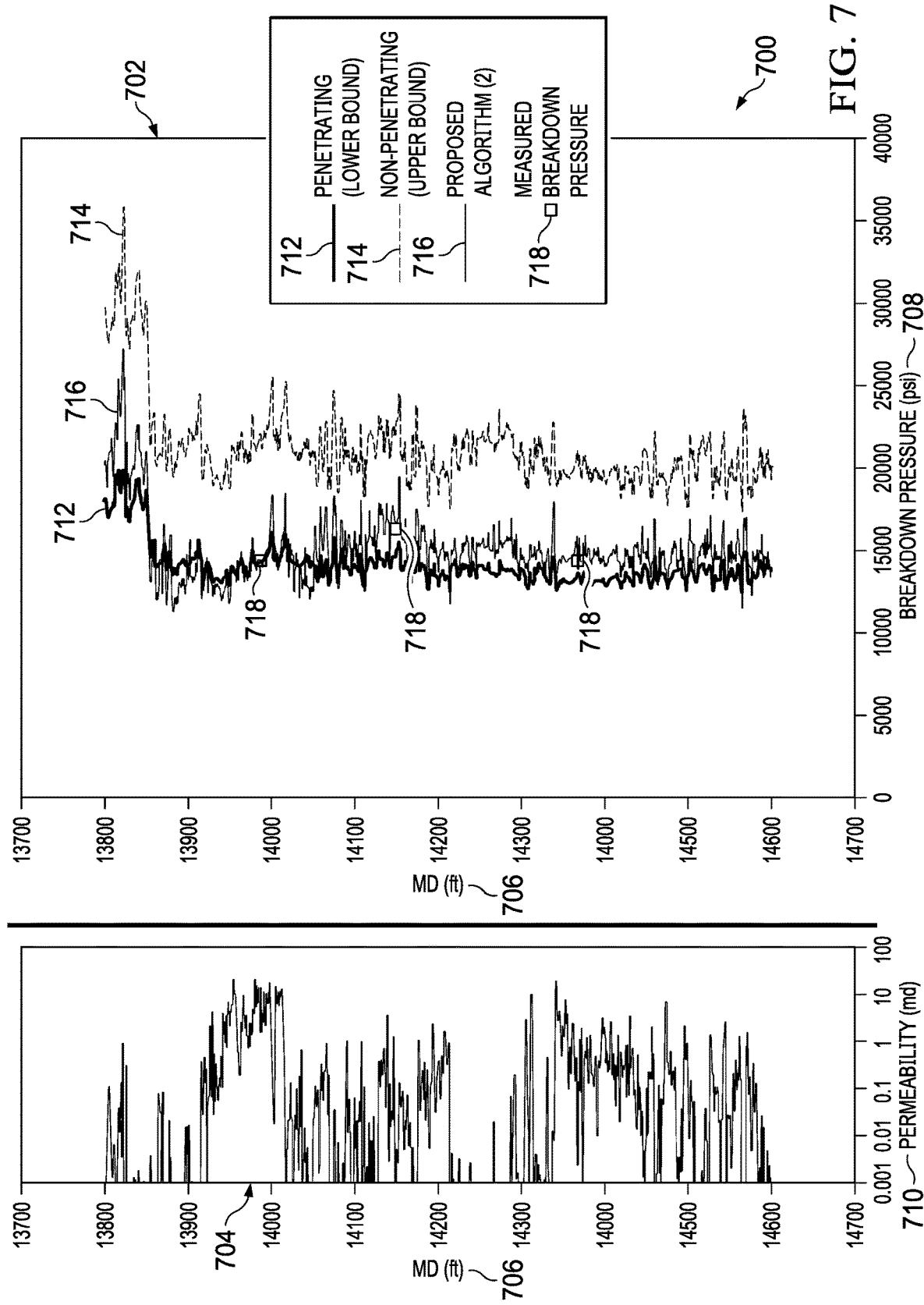
FIG. 7 is a diagram showing examples of a breakdown pressure graph and a permeability plot, according to some implementations of the present disclosure.
Figure 8:
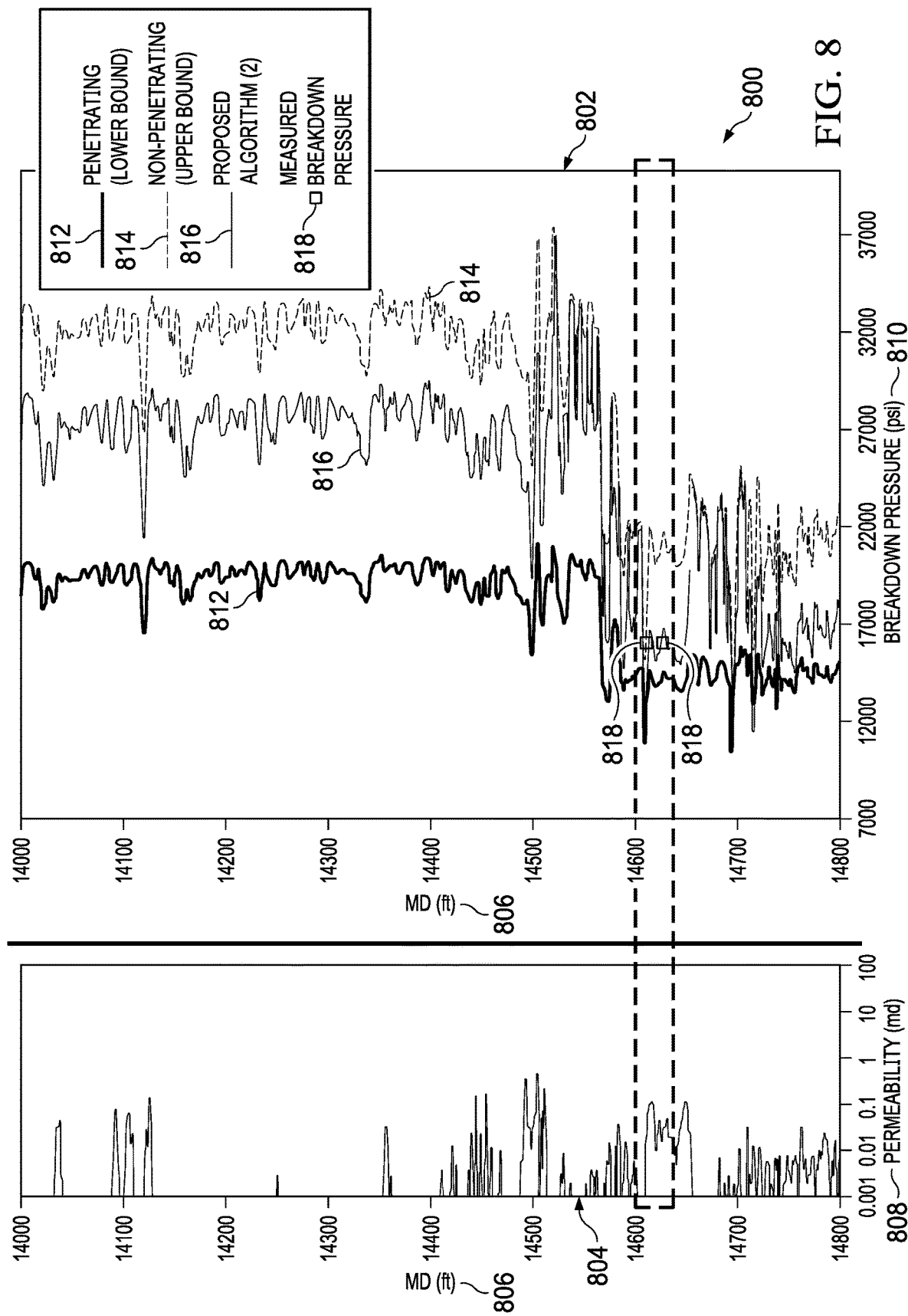
FIG. 8 is a diagram showing examples of a breakdown pressure graph and a permeability plot, according to some implementations of the present disclosure.

The Improved Breakdown Pressure Algorithm (2) was implemented in MATLAB and tested against the data for two different wells. FIGS. 7 and 8 show the results for these two wells along with the lower and upper bounds for the breakdown pressure (as given in Equations (22), and (23)).

FIG. 7 is a diagram 700 showing examples of a breakdown pressure graph 702 and a permeability plot 704, according to some implementations of the present disclosure. The breakdown pressure graph 702 and the permeability plot 704 are plotted relative to a common depth 706 (for example, in feet). The permeability plot 704 shows the formation permeability values 710 (in log scale, in millidarcies (md)). The breakdown pressure graph 702 shows corresponding breakdown pressure values 708 computed in three different ways. Curve 712 uses the lower bound formula (Equation (23)). Curve 714 uses the upper bound formula (Equation (22)). Curve 716 is the pressure from the Improved Breakdown Pressure Algorithm (2). Squares 718 show the measured (actual) breakdown pressure values.

FIG. 8 is a diagram 800 showing examples of a breakdown pressure graph 802 and a permeability plot 804, according to some implementations of the present disclosure. The breakdown pressure graph 802 and the permeability plot 804 are plotted relative to a common depth 806 (for example, in feet). The permeability plot 804 shows the formation permeability values 810 (in log scale, in millidarcies (md)), and the plot on the right shows corresponding breakdown pressure values 808 computed in three different ways. Curve 812 uses the lower bound formula (Equation (23)). Curve 814 uses the upper bound formula (Equation (22)). Curve 816 is the pressure from the Improved Breakdown Pressure Algorithm (2) for two different wells. Squares 818 show the measured (actual) breakdown pressure values measured during the process of hydraulic fracturing, and clearly for both cases. The algorithm was able to match the measured breakdown pressure values in a more accurate way compared to the lower and upper bounds.

Curves 712 and 812, respectively, show the lower bound of the breakdown pressure for both cases. Curves 714 and 814 show the upper bounds in FIGS. 7 and 8, respectively.

Conclusion

In present disclosure, a new improved mathematical algorithm is derived and implemented to predict formation breakdown pressure during hydraulic fracturing operations. The improved algorithm eliminates the dependence on empirical parameters used in prior art methods, which makes it more applicable to be used in practice. The algorithm computes pore pressure and poroelastic stresses as functions of the all the underlying physical parameters including fluid compressibility, viscosity, and rock porosity and permeability. The computed pore pressure and poroelastic stresses are then fed into a derived equation for the breakdown pressure. The algorithm was tested against data from two different wells, and was able to predict the measured breakdown pressure values with great accuracy.

Nomenclature $P_f$=Formation breakdown pressure (psi)
$\sigma_f$=Tensile strength of the rock (psi)
$S_\theta^{(1)}$=The circumferential stress (stress due to tetonic stresses) (psi)
$S_\theta^{(2)}$=Stress induced by borehole pressure (psi)
$S_\theta^{(3)}$=Poroelastic stress (psi)
$P_p$=Pore pressure (psi)
$P_w$=Borehole pressure (psi)
$P_0$=Initial wellbore pressure (psi)
$S_h$=Minimum horizontal stress (psi)
$S_H$=Maximum horizontal stress (psi)
r=Distance from wellbore in radial direction (ft)
a=Wellbore radius (ft)
p(t,r)=Pore pressure as a function of time (seconds) and distance from wellbore (psi)
K=Rock Permeability (md)
$\emptyset$=Rock porosity (dimensionless)

$$c_f = \text{Injection fluid compressiblity}\left(\frac{1}{psi}\right)$$

μ=Injection fluid viscosity (cp)
t=Time (seconds)
$\tilde{p}(s,r)$=Pore pressure solution in the Laplace tranform domain (psi)
$I_0(x)$=Modified Bessel function of the first kind of order 0
$K_0(x)$=Modified Bessel function of the second kind of order 0
β=Empirical parameter (dimensionless)
a=Biot poroelastic parameter (dimensionless)
$K_B$=Bulk modulus including contributions of mineral grains, microcracks, and pores (psi)
$K_M$=Intrinsic bulk modulus of the rock only (psi)
v=Poisson ratio (Dimensionless)
$P_c$=Hydrostatic Confining Pressure (psi)

Figure 9:
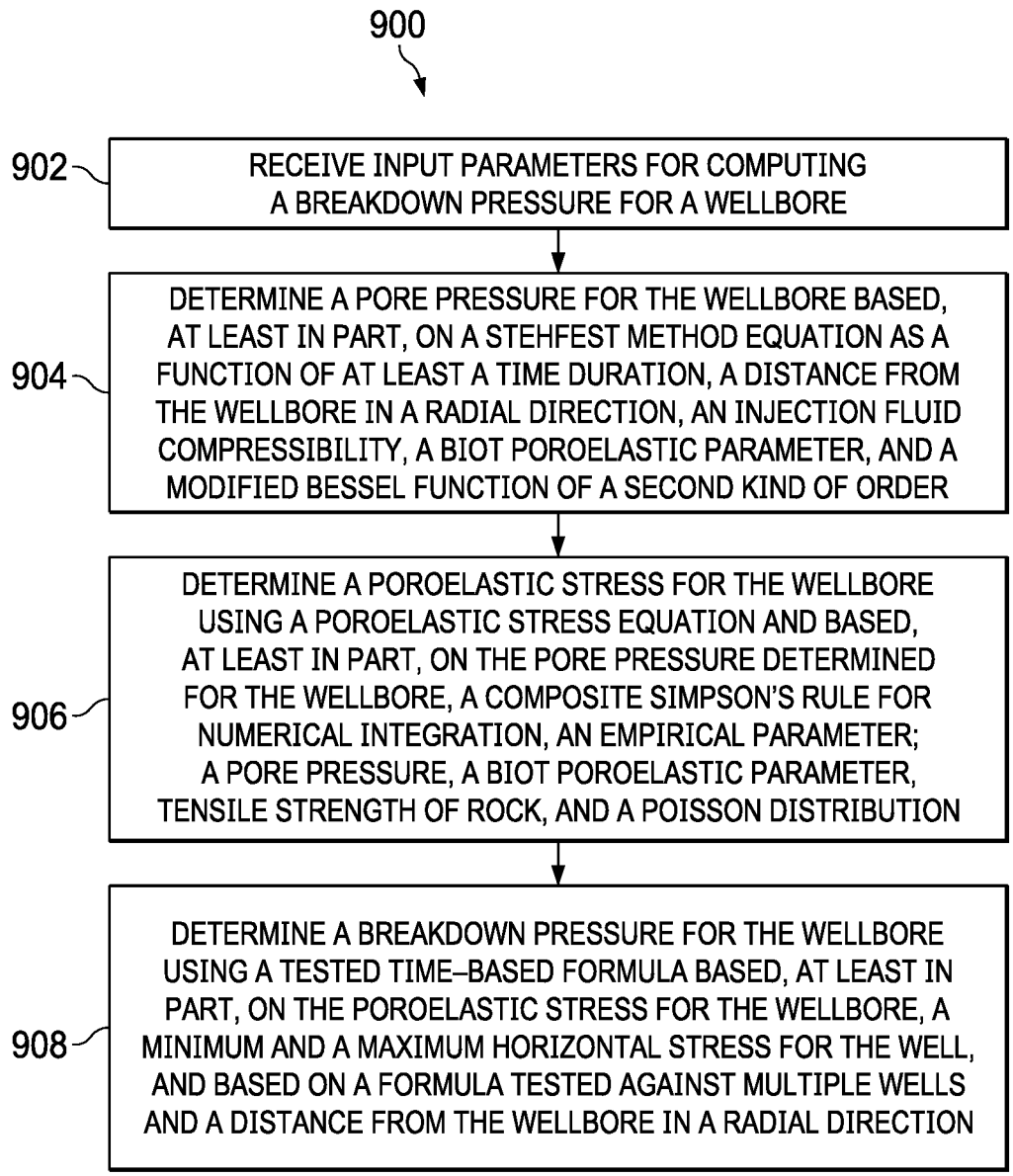
FIG. 9 is a flowchart of an example of a method for predicting formation breakdown pressure for hydrocarbon recovery applications, according to some implementations of the present disclosure.

FIG. 9 is a flowchart of an example of a method 900 for predicting formation breakdown pressure for hydrocarbon recovery applications, according to some implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order. In some implementations, various steps of method 900 can be executed using a formation breakdown pressure application configured to determine breakdown pressures for wellbores using tested time-based formulas.

At 902, input parameters are received for computing a breakdown pressure for a wellbore. As an example, the input parameters can include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth. From 902, method 900 proceeds to 904.

At 904, a pore pressure is determined for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order. As an example, determining the pore pressure can include using a summation of terms in a series approximation, where a number of the terms included in the series approximation is eight, as described with reference to Equation (15).

In some implementations, initial values can be set prior to determining the pore pressure. The initial values can include, for example, the time duration and the distance from the wellbore in the radial direction (for example, 2.5 times the wellbore radius). The initial value for the time duration is a typical time at which the formation is expected to break after a slurry injection for example, 1000 seconds. In addition to the time duration and the distance from the wellbore, the initial values can include the number of terms used in the Stehfest Method expansion. For example, a typical value of n=8 can be used in implementations described in the present disclosure. Another parameter that can be set initially is the number of sub-intervals used in the numerical Composite Simpson's Rule, for example, using a typical value of N–1000 sub-intervals in implementations described in the present disclosure. From 904, method 900 proceeds to 906.

At 906, a poroelastic stress is determined for the wellbore using a poroelastic stress equation and based, at least in part, on the pore pressure determined for the wellbore, a Composite Simpson's Rule for numerical integration, an empirical parameter; a pore pressure, a Biot poroelastic parameter, tensile strength of rock, and a Poisson distribution. For example, Equation (24) can be used. From 906, method 900 proceeds to 908.

At 908, a breakdown pressure is determined for the wellbore using a tested time-based formula based, at least in part, on the poroelastic stress for the wellbore, a minimum and a maximum horizontal stress for the well, and based on a formula tested against multiple wells, the distance from the wellbore in a radial direction, and a distance from the wellbore in a radial direction. As an example, Equation (28) can be used. Determining the breakdown pressure for the wellbore using the tested time-based formula can include executing different versions of the formula for impermeable and permeable rocks, respectively. After 908, method 900 can stop.

In some implementations, method 900 further includes presenting, to a user, a graphical representation of a breakdown pressure relative to a permeability at common depths. For example, graphs and plots as described with reference to FIGS. 4, 5, 7, and 8 can be presented to a user, such as a petroleum engineer. In some implementations, the graphical representation of the breakdown pressure can be presented in a user interface configured to display results of calculations made by the formation breakdown pressure application.

Method 900 and algorithms described in the present disclosure can be implemented (for example, coded) and run on a computer system (for example, computer system 1000). A typical computer system can include a processor, short-term memory (including random access memory (RAM) or cache memories), and long-term memory (for example, including a hard drive) in which a database containing the input information (for example, well data) can be stored. The computer can be associated with a monitor that displays results of algorithms in a readable form, for example, in a graphical user interface (GUI). Algorithms can be implemented in one or more different programming languages. Resulting applications (or software) can rely on underlying operating system application programming interfaces (APIs), standard platform APIs, and a system service layer to execute the code. Implementations of the present disclosure can be implemented in MATLAB or another multi-paradigm programming language used for numerical computing applications.

Figure 10:
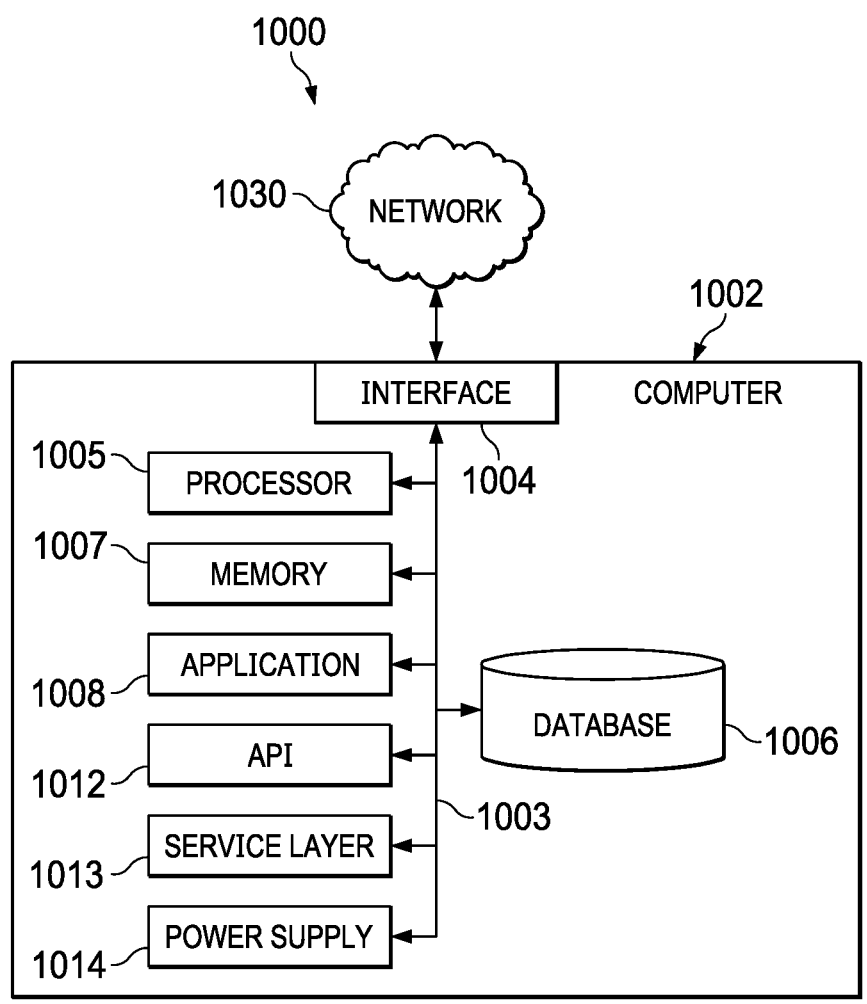
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a top level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both) over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Described implementations of the subject matter can include one or more features, alone or in combination.

For example, in a first implementation, a computer-implemented method includes the following. Input parameters are received for computing a breakdown pressure for a wellbore. A pore pressure is determined for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order. A poroelastic stress is determined for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution. A breakdown pressure is determined for the wellbore using a tested time-based formula based, at least in part, on the poroelastic stress for the wellbore, a minimum and a maximum horizontal stress for the well, and based on a formula tested against multiple wells and the distance from the wellbore in a radial direction.

The foregoing and other described implementations can each, optionally, include one or more of the following features:

A first feature, combinable with any of the following features, the method further including setting, prior to determining the pore pressure, initial values for the time duration and the distance from the wellbore in the radial direction.

A second feature, combinable with any of the previous or following features, where the initial value for the time duration is a typical time at which the formation is expected to break after a slurry injection.

A third feature, combinable with any of the previous or following features, where the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

A fourth feature, combinable with any of the previous or following features, where determining the pore pressure includes using a summation of terms in a series approximation, and where a number of the terms included in the series approximation is eight.

A fifth feature, combinable with any of the previous or following features, where determining the breakdown pressure for the wellbore using the tested time-based formula includes executing different versions of the formula for impermeable and permeable rocks, respectively.

A sixth feature, combinable with any of the previous or following features, the method further including presenting, to a user, a graphical representation of a breakdown pressure relative to a permeability at common depths.

In a second implementation, a non-transitory, computer-readable medium stores one or more instructions executable by a computer system to perform operations including the following. Input parameters are received for computing a breakdown pressure for a wellbore. A pore pressure is determined for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order. A poroelastic stress is determined for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution. A breakdown pressure is determined for the wellbore using a tested time-based formula based, at least in part, on the poroelastic stress for the wellbore, a minimum and a maximum horizontal stress for the well, and based on a formula tested against multiple wells and the distance from the wellbore in a radial direction.

The foregoing and other described implementations can each, optionally, include one or more of the following features:

A first feature, combinable with any of the following features, the operations further including setting, prior to determining the pore pressure, initial values for the time duration and the distance from the wellbore in the radial direction.

A second feature, combinable with any of the previous or following features, where the initial value for the time duration is a typical time at which the formation is expected to break after a slurry injection.

A third feature, combinable with any of the previous or following features, where the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

A fourth feature, combinable with any of the previous or following features, where determining the pore pressure includes using a summation of terms in a series approximation, and where a number of the terms included in the series approximation is eight.

A fifth feature, combinable with any of the previous or following features, where determining the breakdown pressure for the wellbore using the tested time-based formula includes executing different versions of the formula for impermeable and permeable rocks, respectively.

A sixth feature, combinable with any of the previous or following features, the operations further including presenting, to a user, a graphical representation of a breakdown pressure relative to a permeability at common depths.

In a third implementation, a computer-implemented system include: a formation breakdown pressure application configured to determine breakdown pressures for wellbores using tested time-based formulas; a user interface configured to display results of calculations made by the formation breakdown pressure application; one or more processors and a non-transitory computer-readable storage medium coupled to the one or more processors and storing programming instructions for execution by the one or more processors. The programming instructions instruct the one or more processors to perform operations including the following. Input parameters are received for computing a breakdown pressure for a wellbore. A pore pressure is determined for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order. A poroelastic stress is determined for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution. A breakdown pressure is determined for the wellbore using a tested time-based formula based, at least in part, on the poroelastic stress for the wellbore, a minimum and a maximum horizontal stress for the well, and based on a formula tested against multiple wells and the distance from the wellbore in a radial direction.

The foregoing and other described implementations can each, optionally, include one or more of the following features:

A first feature, combinable with any of the following features, the operations further including setting, prior to determining the pore pressure, initial values for the time duration and the distance from the wellbore in the radial direction.

A second feature, combinable with any of the previous or following features, where the initial value for the time duration is a typical time at which the formation is expected to break after a slurry injection.

A third feature, combinable with any of the previous or following features, where the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

A fourth feature, combinable with any of the previous or following features, where determining the pore pressure includes using a summation of terms in a series approximation, and where a number of the terms included in the series approximation is eight.

A fifth feature, combinable with any of the previous or following features, where determining the breakdown pressure for the wellbore using the tested time-based formula includes executing different versions of the formula for impermeable and permeable rocks, respectively.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising: receiving input parameters for computing a breakdown pressure for a wellbore; determining, during hydraulic fracturing operations, a pore pressure for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order; determining a poroelastic stress for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution;
   determining, during the hydraulic fracturing operations, a breakdown pressure for the wellbore using a tested time-based formula based, at least in part, on the poroelastic stress for the wellbore, a minimum and a maximum horizontal stress for the well, properties of fluids and permeability of rock formations, and based on a formula tested against multiple wells and the distance from the wellbore in a radial direction; determining, based at least on the breakdown pressure, a horsepower level needed for creating an adequate fracture geometry used in the hydraulic fracturing operations; determining a successful placement of stimulation materials into a created fracture for the hydraulic fracturing operations;
   determining, based at least on the breakdown pressure, a pressure rating of tubulars required for fracturing treatment.

2. The computer-implemented method of claim 1, further comprising:
   setting, prior to determining the pore pressure, initial values for the time duration and the distance from the wellbore in the radial direction.

3. The computer-implemented method of claim 2, wherein the initial value for the time duration is a typical time at which the formation is expected to break after a slurry injection.

4. The computer-implemented method of claim 1, wherein the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

5. The computer-implemented method of claim 1, wherein determining the pore pressure includes using a summation of terms in a series approximation, and wherein a number of the terms included in the series approximation is eight.

6. The computer-implemented method of claim 1, wherein determining the breakdown pressure for the wellbore using the tested time-based formula includes executing different versions of the formula for impermeable and permeable rocks, respectively.

7. The computer-implemented method of claim 1, further comprising presenting, to a user, a graphical representation of a breakdown pressure relative to a permeability at common depths.

8. A non-transitory, computer-readable medium storing one or more instructions executable by a computer system to perform operations comprising:
   receiving input parameters for computing a breakdown pressure for a wellbore; determining, during hydraulic fracturing operations, a pore pressure for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order;
   determining a poroelastic stress for the wellbore using a poroelastic stress equation and based, at least in part, on the pore pressure determined for the wellbore, a Composite Simpson's Rule for numerical integration, an empirical parameter, a pore pressure, a Biot poroelastic parameter, tensile strength of rock, and a Poisson distribution;
   determining, during the hydraulic fracturing operations, a breakdown pressure for the wellbore using a tested time-based formula based, at least in part, on the poroelastic stress for the wellbore, a minimum and a maximum horizontal stress for the well, properties of fluids and permeability of rock formations, and based on a formula tested against multiple wells and the distance from the wellbore in a radial direction;
   determining, based at least on the breakdown pressure, a horsepower level needed for creating an adequate fracture geometry used in the hydraulic fracturing operations; determining a successful placement of stimulation materials into a created fracture for the hydraulic fracturing operations;
   determining, based at least on the breakdown pressure, a pressure rating of tubulars required for fracturing treatment.

9. The non-transitory, computer-readable medium of claim 8, the operations further comprising:
   setting, prior to determining the pore pressure, initial values for the time duration and the distance from the wellbore in the radial direction.

10. The non-transitory, computer-readable medium of claim 9, wherein the initial value for the time duration is a typical time at which the formation is expected to break after a slurry injection.

11. The non-transitory, computer-readable medium of claim 8, wherein the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

12. The non-transitory, computer-readable medium of claim 8, wherein determining the pore pressure includes using a summation of terms in a series approximation, and wherein a number of the terms included in the series approximation is eight.

13. The non-transitory, computer-readable medium of claim 8, wherein determining the breakdown pressure for the wellbore using the tested time-based formula includes executing different versions of the formula for impermeable and permeable rocks, respectively.

14. The non-transitory, computer-readable medium of claim 8, the operations further comprising presenting, to a user, a graphical representation of a breakdown pressure relative to a permeability at common depths.

15. A computer-implemented system, comprising: a formation breakdown pressure application configured to determine breakdown pressures for wellbores using tested time-based formulas;
a user interface configured to display results of calculations made by the formation breakdown pressure application; one or more processors; and
a non-transitory computer-readable storage medium coupled to the one or more processors and storing programming instructions for execution by the one or more processors, the programming instructions instructing the one or more processors to perform operations comprising:
receiving input parameters for computing a breakdown pressure for a wellbore; determining, during hydraulic fracturing operations, a pore pressure for the wellbore based, at least in part, on a Stehfest method equation as a function of at least a time duration, a distance from the wellbore in a radial direction, an injection fluid compressibility, a Biot poroelastic parameter, and a modified Bessel function of a second kind of order;
determining a poroelastic stress for the wellbore using a poroelastic stress equation and based, at least in part, on the pore pressure determined for the wellbore, a Composite Simpson's Rule for numerical integration, an empirical parameter, a pore well, properties of fluids and permeability of rock formations, and based on a formula tested against multiple wells and the distance from the wellbore in a radial direction; determining, based at least on the breakdown pressure, a horsepower level needed for creating an adequate fracture geometry used in the hydraulic fracturing operations; determining a successful placement of stimulation materials into a created fracture for the hydraulic fracturing operations;
determining, based at least on the breakdown pressure, a pressure rating of tubulars required for fracturing treatment.

16. The computer-implemented system of claim 15, the operations further comprising:
setting, prior to determining the pore pressure, initial values for the time duration and the distance from the wellbore in the radial direction.

17. The computer-implemented system of claim 16, wherein the initial value for the time duration is a typical time at which the formation is expected to break after a slurry injection.

18. The computer-implemented system of claim 15, wherein the input parameters include an initial wellbore pressure, a rock permeability, a rock porosity, an injection fluid compressibility, an injection fluid viscosity, minimum and maximum horizontal stresses, a tensile strength of rock, Biot poroelastic parameter, a Poisson ratio, and a wellbore radius at a particular depth.

19. The computer-implemented system of claim 15, wherein determining the pore pressure includes using a summation of terms in a series approximation, and wherein a number of the terms included in the series approximation is eight.

20. The computer-implemented system of claim 15, wherein determining the breakdown pressure for the wellbore using the tested time—based formula includes executing different versions of the formula for impermeable and permeable rocks, respectively.

* * * * *

UNITED STATES PATENT AND TRADEMARK OFFICE
CERTIFICATE OF CORRECTION

PATENT NO. : 11,675,106 B2
APPLICATION NO. : 17/243365
DATED : June 13, 2023
INVENTOR(S) : Tameem Almani, Khaqan Khan and Mohammad H. Altwaijri It is certified that error appears in the above-identified patent and that said Letters Patent is hereby corrected as shown below:

In the Claims

In Column 29, Line 59, Claim 1, please replace "operations;" with -- operations; and --

In Column 30, Line 59, Claim 8, please replace "operations;" with -- operations; and --

In Column 32, Line 5, Claim 15, between the words "pore" and "well" please insert the following:
-- pressure, a Biot poroelastic parameter, tensile strength of rock, and a Poisson distribution;
determining, during the hydraulic fracturing operations, a breakdown pressure for the wellbore using a tested time–based formula based, at least in part, on the poroelastic stress for the wellbore, a minimum and a maximum horizontal stress for the --

In Column 32, Line 14, Claim 15, please replace "operations;" with -- operations; and --

Signed and Sealed this
Twenty-ninth Day of August, 2023

Katherine Kelly Vidal
*Director of the United States Patent and Trademark Office*